United States Patent
Hogan et al.

(10) Patent No.: US 9,423,801 B2
(45) Date of Patent: Aug. 23, 2016

(54) CONTINUOUS MANUFACTURING SYSTEM

(75) Inventors: John Patrick Hogan, Piscataway, NJ (US); H. Steven Misner, Verona, NJ (US); Peter Wisniewski, Flemmington, NJ (US); Tammy Evans, Easton, PA (US); Shawn Flanders, Manalapan, NJ (US); Ron Growe, Flanders, NJ (US); Ramon Santana, Teaneck, NJ (US); Paul Vincenti, Jefferson, NJ (US)

(73) Assignee: Colgate-Palmolive Company, New York, NY (US)

( * ) Notice: Subject to any disclaimer, the term of this patent is extended or adjusted under 35 U.S.C. 154(b) by 923 days.

(21) Appl. No.: 12/976,565

(22) Filed: Dec. 22, 2010

(65) Prior Publication Data

US 2012/0164090 A1  Jun. 28, 2012

(51) Int. Cl.
  *G05D 11/13* (2006.01)
  *G05D 7/00* (2006.01)
  *A61K 8/00* (2006.01)
  *A61Q 15/00* (2006.01)

(52) U.S. Cl.
  CPC .................................. *G05D 11/138* (2013.01)

(58) Field of Classification Search
  CPC ......... G05D 11/138; G05D 7/00; A61K 8/00; A61Q 15/00
  See application file for complete search history.

(56) References Cited

U.S. PATENT DOCUMENTS

| | | | |
|---|---|---|---|
| 4,722,835 A * | 2/1988 | Schamper et al. | 424/66 |
| 5,490,979 A | 2/1996 | Kasat et al. | |
| 6,149,897 A | 11/2000 | Swaile | |
| 6,338,840 B1 | 1/2002 | Allan et al. | |
| 7,128,901 B2 | 10/2006 | Jonas et al. | |
| 8,616,761 B2 | 12/2013 | McLaughlin et al. | |
| 2001/0041169 A1 | 11/2001 | Allan et al. | |
| 2002/0048213 A1 | 4/2002 | Wilmer et al. | |
| 2009/0141583 A1 | 6/2009 | Fanjat et al. | |
| 2010/0041169 A1 | 2/2010 | Lee | |
| 2010/0137450 A1 | 6/2010 | Muller et al. | |

FOREIGN PATENT DOCUMENTS

| | | |
|---|---|---|
| RU | 2399082 | 10/2009 |
| WO | WO 02/09859 | 2/2002 |
| WO | WO02/051898 | 7/2002 |
| WO | WO 2009/069090 | 6/2009 |

OTHER PUBLICATIONS

Maiwald, et al. "Quantitative high-resolution on-line NMR spectroscopy in reaction and process montoring ." J. of Magn. Reson. 166, pp. 135-146 (2004).
Burcham et al. "The Origin of the Ligand Effect in Metal Oxide Catalysts: Novel Fixed-Bed in Situ Infrared and Kinetic Studies during Methanol Oxidation" J. of Catalysis 203, pp. 104-121 (2001).
Vanarase, et al. "Real time montoring of drug concentration in a continuous powder mixing process using NIR spectroscopy". Chem. Eng. Sci. pp. 1-6 (2010).
Giridhar, et al. "Engineering Research Center for Structured Organic Particulate Synthesis (ERC-SOPS)". American Control Conference pp. 2741-2743, Jun. 10-12, 2009.
Paakkunainen, et al. "Uncertainty and periodic behavior of process derived from online NIR". Analytica Chimica Acta 642, pp. 206-211 (2009).
Tosi, et al. "Assessment of In-Line Near-Infrared Spectroscopy for Continuous Monitoring of Fermentation Process." Bio. Progerss, vol. 19, issue 6, pp. 1816-1821 (2003) Abstract.
Ferstl, et al. "Inline Analysis in Microreaction Technology: A Suitable Tool for Process Screening and Optimization." Chem. Eng. & Tech. [Special Issue] 'Micro Process Tech.' vol. 30, issue 3 pp. 370-378 (2007) Abstract.
International Search Report and Written Opinion issued in Intematimal Application No. PCT/US2011/062027 on Jun. 14, 2012.

\* cited by examiner

*Primary Examiner* — Aradhana Sasan

(57) ABSTRACT

A continuous system for manufacturing a composition that contains an active ingredient that includes a base manufacturing portion and an addition portion. The system can manufacture compositions having different levels of the active ingredient. A base is formed that contains a first level of the active ingredient that is desired for any composition to be manufactured. The addition portion can be used to add more of the materials for the composition to lower the level of the active ingredient, or more active ingredient can be added to increase the level of the active ingredient. The system is controlled by a sensor that measures an amount of associated material that is associated with the active ingredient. This is useful when the active ingredient is not detectable by the sensor.

18 Claims, No Drawings

CONTINUOUS MANUFACTURING SYSTEM

BACKGROUND

Historically, antiperspirants were made in batches to create different formulations for different products. All batch materials were added consecutively into a large tank and mixed and heated to processing temperature until the next higher melting point material could be added. Once a batch was finished, it needed to be transferred to another tank of equal size to hold as surge for the filling operation. In order to achieve proper mixing for product uniformity, at least a half batch quantity was typically produced, making it difficult to manufacture small production runs. The batch cycle time was very long, typically 7.5 to 9 hours because of the time needed to reach processing temperature and properly mix all materials. Continuous processes have also been used, but the continuous processes have been used to make one formulation with the need to make a change over between formulations. It would be desirable to have a continuous process that could manufacture different formulas without the need for changing over the entire production process. This would result in increased efficiency and the ability to make the desired amount of product.

In an antiperspirant composition, the amount of the antiperspirant active needs to be controlled to its target amount in the composition. In continuous systems, near-infrared (NIR) sensors can be used to measure the amount of a material in a composition. Antiperspirant actives are aluminum containing salts, and they are not detectable by NIR sensors. It would be desirable to manufacture antiperspirant compositions in a continuous process and to control the amount of antiperspirant in the composition.

SUMMARY

A continuous system for manufacturing a composition that contains an active ingredient that includes a base manufacturing portion and an addition portion. The system can manufacture compositions having different levels of the active ingredient. A base is formed that contains a first level of the active ingredient that is desired for any composition to be manufactured. In certain embodiments, the first level is the highest level of the active ingredient. When compositions with lower levels of the active ingredient are desired to be manufactured, additional materials for the composition are added through the addition portion of the system to provide compositions with lower levels of the active ingredient. When compositions with higher levels of the active or additional different active ingredients are desired to be manufactured, additional active ingredient is added through the addition portion of the system to provide compositions with higher levels of the active ingredient. The system allows for switch over to compositions with different levels of the active ingredient without shutting down the system. Also, the addition portion can be used to increase capacity of the system by adding the same materials that are included in the base.

1.0 Provided is a continuous system for manufacturing a composition containing at least one active ingredient, wherein the continuous system can manufacture at least two compositions having a different level of the active ingredient comprising:

a) a base manufacturing portion of the continuous system for mixing the active ingredient with at least one additional material for the composition, b) an addition portion of the continuous system after the base manufacturing portion of the continuous system for adding at least one of the additional materials for the composition, and c) a sensor for controlling the system and an amount of active ingredient in the composition, wherein the sensor measures an amount of an associated material that is associated with the active ingredient.

1.1 The continuous system of 1.0, wherein the sensor cannot detect the active ingredient.

1.2 The continuous system of 1.0 to 1.1, wherein the sensor is a near-infrared sensor.

1.3 The continuous system of 1.0 to 1.2, wherein the continuous system is split into at least two streams after the base manufacturing portion, and the addition portion is present on at least one of the at least two streams.

1.4 The continuous system of 1.0 to 1.3 further comprising an additive system.

1.5 The continuous system of 1.4, wherein the additive system is after the addition portion.

1.6 The continuous system of 1.0 to 1.5 further comprising an inline mixer after the addition portion.

1.7 The continuous system of 1.0 to 1.6, wherein the active ingredient is inorganic, and the associated material is organic.

1.8 The continuous system of 1.0 to 1.7, wherein the active ingredient comprises an antiperspirant comprising an aluminum containing salt.

1.9 The continuous system of 1.0 to 1.8, wherein the associated material is at least one material chosen from an amino acid, glycine, trimethylglycine, polyethylene glycol, and propylene glycol.

1.10 The continuous system of 1.0 to 1.9, wherein the associated material is not an additional material.

2.0 A process for operating the continuous system of any of claims 1.1 to 1.10 for controlling the amount of active ingredient when the sensor cannot detect the active ingredient comprising:

a) forming a first base in the base manufacturing portion of the continuous system comprising mixing the active ingredient with the at least one additional material for the composition, b) adding to the base through the addition portion
  i) at least one of the additional materials to form a second base having a lower level of the active ingredient,
  ii) the active ingredient to form a second base having a higher level of the active ingredient, or
  iii) more materials that formed the first base to produce more of the first base, and c) controlling the continuous system by measuring the amount of the associated material with the sensor and adjusting the composition until a desired level of active ingredient is obtained.

2.1 The process of 2.0, wherein the adding to the base through the addition portion comprises the at least one of the additional materials to form a second base having a lower level of the active ingredient.

2.2 The process of 2.1, wherein the second base is diluted with all of the additional materials that are included in the first base.

2.3 The process of 2.2, wherein the additional materials added to the second base are in the same proportion to each other as are added to the first base.

2.4 The process of 2.0, wherein the adding to the base through the addition portion comprises the active ingredient to form a second base having a higher level of the active ingredient.

2.5 The process of any of claims 2.0 to 2.4, wherein the only difference between the first base and the second base is the level of the active ingredient.

2.6 The process of 2.0, wherein the adding to the base through the addition portion comprises the more materials that formed the first base to produce more of the first base.

2.7 The process of 2.6, wherein the antiperspirant is present in the first base in a maximum amount that does not require a prescription for use.

2.8 The process of any of claims 2.0 to 2.7, wherein the continuous system further comprises an additive system, and the process further comprises adding an additional material to the composition through the additive system.

3.0 A process for operating the continuous system of 1.0 comprising:
a) forming a first base in the base manufacturing portion of the continuous system comprising mixing the active ingredient with the at least one additional material for the composition,
b) adding to the base through the addition portion
   i) at least one of the additional materials to form a second base having a lower level of the active ingredient,
   ii) the active ingredient to form a second base having a higher level of the active ingredient, or
   iii) more materials that formed the first base to produce more of the first base, and
c) controlling the continuous system by measuring the amount of the associated material with the sensor and adjusting the composition until a desired level of active ingredient is obtained.

DETAILED DESCRIPTION

As used throughout, ranges are used as a shorthand for describing each and every value that is within the range. Any value within the range can be selected as the terminus of the range. Unless otherwise specified, all percentages and amounts expressed herein and elsewhere in the specification should be understood to refer to percentages by weight. The amounts given are based on the active weight of the material. In addition, all references cited herein are hereby incorporated by reference in their entireties. In the event of a conflict in a definition in the present disclosure and that of a cited reference, the present disclosure controls.

Provided is a continuous system for manufacturing a composition containing an active ingredient, wherein the continuous system can manufacture at least two compositions having a different level of the active ingredient. In certain embodiments, the system is designed to manufacture a base that contains the highest level of the active ingredient for any product that is to be manufactured by the system. The base includes ingredients that are common to all products to be manufactured in the continuous system. The system includes a base manufacturing portion of the continuous system for mixing the active ingredient with at least one additional material for the composition. Also, the continuous system includes an addition portion after the base manufacturing portion of the continuous system for adding at least one of the additional materials for the composition.

In certain embodiments, the addition portion of the continuous system will add all of the same materials that were added to the base composition (first base), except for the active ingredient, to form a second base. In certain of these embodiments, the proportion of materials added to the second base is the same proportion of materials added to the first base. This will produce a second base that is the same as the first base except for the level of the active ingredient. In other embodiments, the second base can be made by using different proportions of the materials, not including at least one of the materials, or including an additional material to further form the second base.

In another embodiment, the addition portion can add more of the active ingredient or an additional active ingredient to alter the level of the active ingredient.

In another embodiment, the addition portion can increase the capacity of the system by adding more of the materials that are included in the first base to maintain the composition of the first base.

In optional embodiments after the base manufacturing portion, the continuous process can be split into two or more streams with at least one of the streams having the addition portion. These embodiments allow for the manufacturing of multiple products with different levels of active ingredient separately or for increasing capacity.

The additive system can add materials in any form, such as fluids, liquids, slurries, solids, and powders.

In certain embodiments, the system can further include an optional additive system for adding materials that are specific for each product variant that is manufactured. The additive system can add the additional materials to the base manufacturing portion, to the addition portion, or after the addition portion. Examples of these additional materials include, but are not limited to, fragrance, flavors, colors, emollients, diluents, hardeners, waxes, alternate or increased actives, preservatives or suspended materials. For example, different fragrances can be added to the composition to make different fragrance variants. The system can be operated to include the added material in the base to produce products with different levels of active ingredient or efficacy, or fragrance can be added to the addition portion of the system or after the addition portion of the system to create different fragrance variants with different levels of active ingredient.

Optionally, the continuous system can include an inline mixer, such as a static mixer, to aid in the mixing of materials in the continuous system. In some embodiments, the materials in the composition can mix while flowing in the continuous system. In other embodiments, an inline mixer may be needed to mix the materials. One or more inline mixers can be included in the continuous system at any point in the continuous system to aid in mixing of the materials.

The base contains ingredients that are common to all product formulas including the active ingredient. In certain embodiments, the amount of active ingredient in the base is the amount that is used in the highest active ingredient level product.

The continuous process can be operated by forming a first base in the base manufacturing portion of the continuous system comprising mixing the active ingredient with at least one of the additional materials for the composition, and diluting the base with at least one of the additional materials to form a second base having a lower level of the active ingredient.

In another embodiment, the continuous process can be used to increase capacity of the process. When there is a limitation in the initial part of the system for meeting desired capacity, such as pump capacity, pressure drop, mixing efficiency, or various viscosity building effects, a second dosing using the addition portion can increase the capacity. In certain embodiments, the second dosing can use the same or nearly the same materials that are used in the base manufacturing portion to increase the capacity of the system. In many embodiments, the use of the addition portion will increase the overall capacity of the system whether the same materials are used or are different.

When a composition with the highest level of active ingredient is to be manufactured, the continuous process is operated without the addition portion because there is no need to dilute the composition.

When a composition with a lower level of active ingredient is to be manufactured, additional materials are added through the addition portion. The addition portion can be fed with the same materials using the same feed systems that are used for the base manufacturing portion.

When a composition with a higher level of active ingredient is to be manufactured, additional active ingredient or other active ingredients are added through the addition portion. In certain embodiments, this type of addition will use a concentrated active ingredient or the active ingredient in a solid form, such as powder.

The process is controlled by a sensor that measures the amount of an associated material that is associated with the active ingredient. In certain embodiments, the sensor can detect both the associated material and the active ingredient. In other embodiments, the process does not control the level of active ingredient directly. The process is controlled by measuring an amount of associated material that is associated with the active ingredient. In certain embodiments, the active ingredient is inorganic. In certain embodiments, the associated material that is associated with the active ingredient is organic.

Any sensor that can detect the associated material can be selected. In certain embodiments, the sensor is a near-infrared sensor. A near-infrared sensor that can be used in the system is FOSS XDS NIR Process Analytics™ MicroBundle Multiplexer from FOSS NIRSystems, Inc. The sensor can be placed anywhere in the process where the level of active ingredient needs to be determined.

In certain embodiments, the continuous system is useful for manufacturing antiperspirant compositions. In these compositions, the active ingredient is the antiperspirant active. There are some products that include an antiperspirant active at or near the maximum amount, and there are product variants that have lower levels of antiperspirant active.

Antiperspirant actives that can be included in an antiperspirant composition are those listed in the U.S. Code of Federal Regulations at 21 CFR 350.10. The maximum amount of each type of antiperspirant active that can be included in an over the counter composition without the need for a prescription is also provided in these regulations. Examples of antiperspirant actives include, but are not limited to, aluminum chloride, aluminum chlorohydrate, aluminum chlorohydrex polyethylene glycol, aluminum chlorohydrex propylene glycol, aluminum dichlorohydrate, aluminum dichlorohydrex polyethylene glycol, aluminum dichlorohydrex propylene glycol, aluminum sesquichlorohydrate, aluminum sesquichlorohydrex polyethylene glycol, aluminum sesquichlorohydrex propylene glycol, aluminum zirconium octachlorohydrate, aluminum zirconium octachlorohydrex gly, aluminum zirconium pentachlorohydrate, aluminum zirconium pentachlorohydrex gly, aluminum zirconium tetrachlorohydrate, aluminum zirconium tetrachlorohydrex gly, aluminum zirconium trichlorohydrate, aluminum zirconium trichlorohydrex gly, and combinations thereof.

When the active ingredient is an antiperspirant, the material associated with the antiperspirant is typically an organic material, such as an amino acid, glycine, trimethylglycine, propylene glycol, or polyethylene glycol. These types of organic materials are included as stabilizers for antiperspirants.

In the antiperspirant embodiment, the organic material is measured by the sensor, such as near-infrared sensor, because the aluminum containing antiperspirant salts are not detectable by many types of sensors, such as near-infrared sensors. In these compositions, the organic material is in an amount that is directly associated with the aluminum salt. Measuring the amount of organic material provides the amount of the aluminum containing antiperspirant.

For each active and base formulation, a correlation is developed between the organic material associated with the active and the active. The correlation translates the amount of associated material to the amount of active. First, data are collected on compositions that have known levels of active, and the level of the associated material is measured. After the data are collected, the data are statistically analyzed to determine the correlation. The data can be analyzed using the software from the sensor supplier, such as Vision software from FOSS NIRSystems, Inc. In one embodiment, two different sets of software can be used to analyze the data sets. Vision, the program that was originally used to acquire the data, is used to perform regressions and formulate correlations. Optionally, software can be used to check statistical significance and validate the correlation. Any such type software can be used. For example, method validation software can be obtained from EffiChem.

The antiperspirant composition can be in any form, such as stick, soft solid, gel, roll-on, or aerosol. In certain embodiments, the antiperspirant composition is a stick antiperspirant.

Examples of antiperspirant compositions that can be made using the continuous system include, but are not limited to, the compositions described in U.S. Patent Application Publication Nos. 2008/0187504A1 and 2009/0317347A1. Other compositions are described in the following U.S. Patent or Patent Application Publication Nos.: US20050191257A1, US20050118125A1, US20050095210A1, US20040202629A1, US20040180013A1, US20040175346A1, US20040028628A1, U.S. Pat. No. 6,682,749 B1, US20030235545A1, US20030235546A1, US20030161800A1, US20030113283A1, U.S. Pat. No. 6,485,716 B1, U.S. Pat. No. 6,436,382 B1, U.S. Pat. No. 6,426,062 B1, US20020085985A1, US20020081272A1, US20020081273A1, U.S. Pat. No. 6,403,069 B1, U.S. Pat. No. 6,387,357 B1, U.S. Pat. No. 6,338,841 B1, U.S. Pat. No. 6,180,125 B1, U.S. Pat. No. 6,180,121 B2, U.S. Pat. No. 6,180,125 B2, U.S. Pat. No. 6,180,121 B1, U.S. Pat. No. 6,036,964 A. In certain embodiments, the continuous process can manufacture the compositions that are gelled with polyethylene and hydrogenated soy described in US2008/0187504A1.

What is claimed is:

1. A continuous system for manufacturing at least two compositions containing at least one active ingredient, wherein the continuous system can manufacture the at least two compositions having a different level of the active ingredient comprising:
   a) a base manufacturing portion of the continuous system for mixing the active ingredient with at least one additional material to make a first base composition,
   b) an addition portion of the continuous system after the base manufacturing portion of the continuous system to form at least one second base composition by adding,
      i) the at least one additional material to form the at least one second base having a lower level of the active ingredient,
      ii) the active ingredient to form a second base having a higher level of the active ingredient, or iii) more of the active ingredient and the at least one material that formed the first base to produce more of the first base, and c) a near-infrared sensor for controlling the system and an amount of active ingredient in the at least one second base composition, wherein the sensor measures an amount of an associated material that is associated with the active ingredient, wherein the sensor cannot detect the active ingredient, and wherein the active ingredient is inorganic, and the associated material is organic.

2. The continuous system of claim 1, wherein the continuous system is split into at least two streams after the base manufacturing portion, and the addition portion is present on at least one of the at least two streams.

3. The continuous system of claim 1 further comprising an additive system.

4. The continuous system of claim 3, wherein the additive system is after the addition portion.

5. The continuous system of claim 1 further comprising an inline mixer after the addition portion.

6. The continuous system of claim 1, wherein the active ingredient comprises an antiperspirant comprising an aluminum containing salt.

7. The continuous system of claim 1, wherein the associated material is at least one material chosen from an amino acid, glycine, trimethylglycine, polyethylene glycol, and propylene glycol.

8. The continuous system of claim 1, wherein the associated material is not an additional material.

9. A process for operating the continuous system of claim 1 for controlling the amount of active ingredient comprising:
a) forming the first base composition in the base manufacturing portion of the continuous system comprising mixing the active ingredient with the at least one additional material for the first base composition,
b) adding to the first base composition through the addition portion
   i) at least one of the additional materials to form the at least one second base having a lower level of the active ingredient,
   ii) the active ingredient to form a second base having a higher level of the active ingredient, or
   iii) more materials that formed the first base to produce more of the first base, and
c) controlling the continuous system by measuring the amount of the associated material with the sensor and adjusting the composition until a desired level of active ingredient is obtained.

10. The process of claim 9, wherein the adding to the first base composition through the addition portion comprises the at least one of the additional materials to form a second base having a lower level of the active ingredient.

11. The process of claim 10, wherein the second base is diluted with all of the additional materials that are included in the first base.

12. The process of claim 11, wherein the additional materials added to the second base are in the same proportion to each other as are added to the first base.

13. The process of claim 9, wherein the adding to the first base composition through the addition portion comprises the active ingredient to form a second base having a higher level of the active ingredient.

14. The process of claim 9, wherein the only difference between the first base composition and the second base composition is the level of the active ingredient.

15. The process of claim 9, wherein the adding to the first base composition through the addition portion comprises the more materials that formed the first base composition to produce more of the first base composition.

16. The process of claim 9, wherein the compositions are antiperspirant compositions, and the active ingredient is an antiperspirant.

17. The process of claim 16, wherein the antiperspirant is present in the first base composition in a maximum amount that does not require a prescription for use.

18. The process of claim 9, wherein the continuous system further comprises an additive system, and the process further comprises adding an additive material to the composition through the additive system.

* * * * *